United States Patent
Sykes

[11] Patent Number: 5,922,144
[45] Date of Patent: Jul. 13, 1999

[54] ACCELERATED STEEL REMOVAL PROCESS

[76] Inventor: William S. Sykes, 3037 Rex Dr., Jacksonville, Fla. 32216

[21] Appl. No.: 09/166,887

[22] Filed: Oct. 5, 1998

[51] Int. Cl.$^6$ .................................................. B23K 7/00
[52] U.S. Cl. ................................................. 148/194; 266/48
[58] Field of Search ............................ 148/194, 196, 148/202, 204, 205; 266/48, 51, 76, 69

[56] References Cited

U.S. PATENT DOCUMENTS

| | | | |
|---|---|---|---|
| 1,957,351 | 5/1934 | Oldham | 148/202 |
| 2,184,560 | 12/1939 | Moss | 266/48 |
| 2,515,302 | 7/1950 | Hughey | 266/76 |
| 3,216,867 | 11/1965 | De Vries et al. | 148/194 |
| 4,139,180 | 2/1979 | Itani et al. | 266/69 |

OTHER PUBLICATIONS

Stinger tip size chart, p. 32, Dec. 1990.

*Primary Examiner*—Scott Kastler
*Attorney, Agent, or Firm*—Matthew Pasulka

[57] ABSTRACT

A method for cutting steel in which an operator uses high pressure propane and oxygen. The operator heats the steel locally until it is molten, positions a cutting torch with a high angle of incidence relative to the molten steel, and then blasts high pressure oxygen at the molten metal. Such blast serves two purposes, heating the molten metal so it is less viscous and then blowing the molten metal away from the steel sheet creating a cutting trench. The cutting torch is positioned relative to the cutting trench to provide even heat. The cutting torch is then moved generally parallel to the cutting trench to lengthen the cut.

7 Claims, 5 Drawing Sheets

ACCELERATED STEEL REMOVAL PROCESS

THE FIELD OF THE INVENTION

The present invention is generally directed to a new method for cutting steel. More specifically, it, is a process by which large amounts of steel may be removed, perhaps from a steel ship, in short amounts of time, thus increasing the efficiency of the operation and lowering costs.

BACKGROUND OF THE INVENTION

Welding and its counterpart, cutting, have been well known for years. Welding is the process of taking two pieces of metal and joining them together whereas cutting is having one piece of metal and dividing it into two or more pieces.

The traditional method of cutting involves oxygen/acetylene torches. The cutting torch operator would set the oxygen level to 40 to 60 pounds per square inch and the acetylene setting would be regulated to 8 to 15 pounds per square inch. The operator would use the cutting torch to heat the metal in a local area until it became molten and then would apply additional oxygen heating up the metal even more to reduce viscosity and blow the molten metal out the other side of the metal plate. The cutting head of the torch was generally perpendicular to the item being cut. The operator would slowly move the cutting tip down the proposed cutting line. The process of cutting steel is a very slow and tedious process. Metal workers in shipyards across the country spend countless hours cutting steel from damaged or outdated ships so that they may be refit with new and operational equipment.

As such, a need currently exists for an improved method of cutting metal. The method must be cost efficient and safe as well.

SUMMARY OF THE INVENTION

The present invention recognizes and addresses the foregoing disadvantages, and other prior art methods.

Accordingly, it is an object of the present invention to provide an improved method which allows an operator to cut metal at a faster rate. It is another object of the invention to provide a safe method for cutting metal quickly.

These and other objects of the present invention are achieved by providing a method for cutting metal which is particularly well suited for salvage work in and about ships. The process includes heating a metal locally to a molten state, removing the molten metal using a pressurized gas, directing the molten metal away from the operator, adjusting at least one of the position and strength of the heat source so that the molten metal flows evenly away from the operator thus making an even cut and moving the cutting torch in a direction generally parallel to the desired cut line to expand the cut line.

Additional objects and advantages of the invention are set forth in the detailed description herein, or will be apparent to those of ordinary skill in the art. Also it should be appreciated that modifications and variations to the specifically illustrated and discussed steps may be practiced in various embodiments and uses of this invention without departing from the spirit and scope thereof, by virtue of present reference thereto. Such variations may include but are not limited to, substitution of equivalent steps for those shown or discussed and the reversal of various steps, or the like.

Another exemplary embodiment concerns a method for cutting metal, wherein a metal is heated locally to a molten state by holding a cutting torch generally perpendicular to the surface. The cutting torch has a two-part tip which controls the release of gases in separate streams. The cutting torch also has a control means to gradually increase gas pressures. The gases are directed at the molten metal at an angle of incidence of at least about 45°. The flow rate of the gases are increased to remove the molten metal from the local area creating a cutting trench. The direction of the gases is generally maintained, removing the molten metal from the cutting trench at an angle of reflection away from the operator. The cutting torch is moved generally parallel to a desired cut line. Varying either the distance from the cutting tip to the metal or varying the flow rate of the gases or both is often necessary for providing even heat to make an even cut.

Other objects, features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
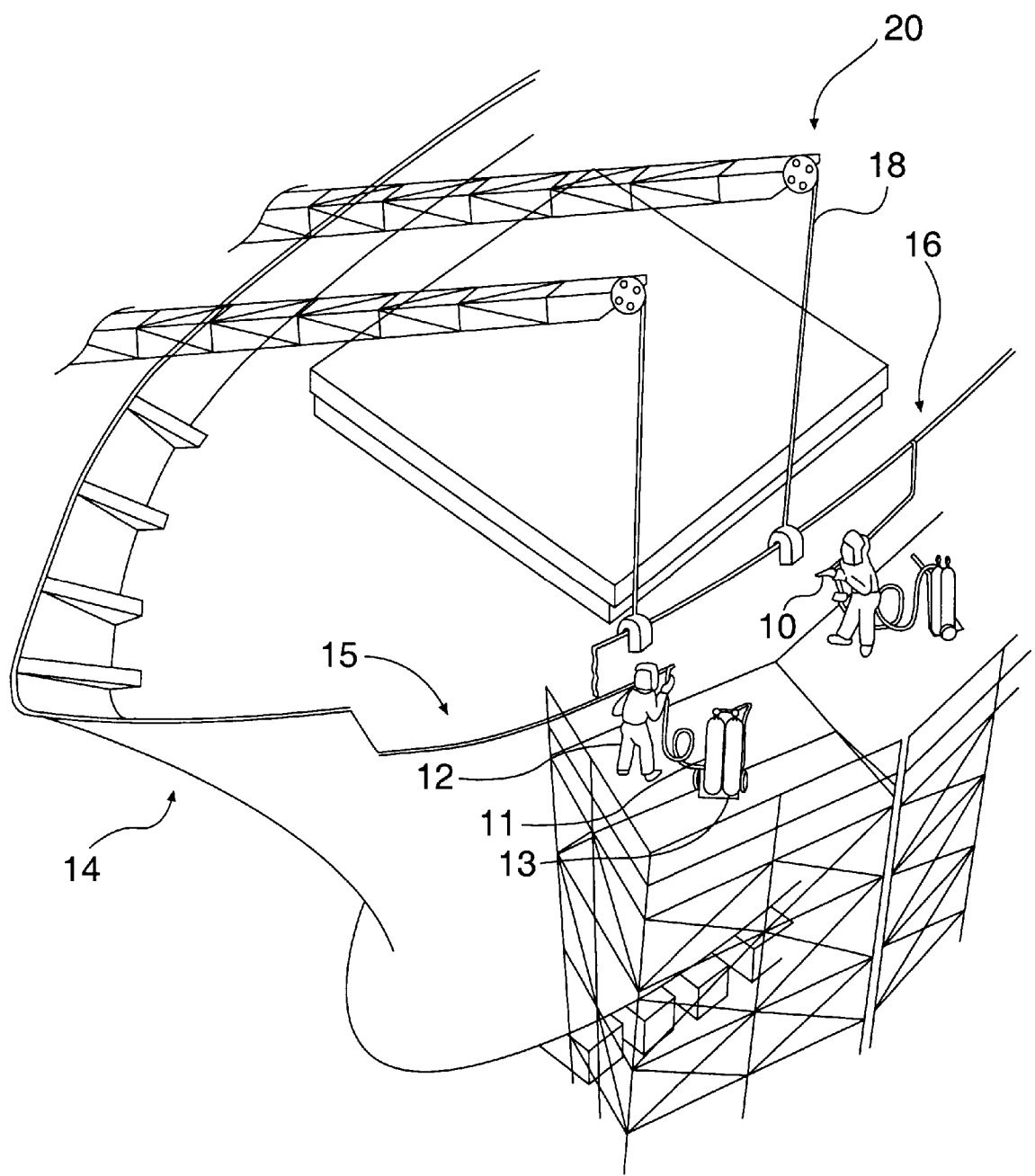
FIG. 1 is a perspective view representing an exemplary embodiment of the subject method in operation.

Repeat use of reference characters in the present specification and drawings is intended to represent same or analogous features of elements of the invention.

DETAILED DESCRIPTION OF THE PREFERRED EMBODIMENTS

It is to be understood by one of ordinary skill in the art that the present discussion is a description of exemplary embodiments only and is not intended as limiting the broader aspects of the present invention. The broader aspects are embodied in the exemplary construction.

In general, the present invention is directed to a method of cutting steel which is easy, safe, and cheap. Referring now to FIG. 1 which shows a typical use of the accelerated steel cutting method being employed on the salvage of a ship, cutting torch 10 is used by operator 12 to cut steel piece 16 from ship 14. In doing so, the operators have secured the piece to prevent it from falling by use of crane 20 connected to the steel piece 16 by cables 18. Piece 15 of ship 14 is shown as already removed using the method. Additionally, this method may be employed within the ship as well.

In testing this method, the results speak for themselves. Using half inch mild steel, this method resulted in a cut rate of 13 feet in 90 seconds. This is anywhere from 5 to 8 times as fast as conventional methods.

In order to achieve the desired results from the method, proper equipment must be used. A combustion enhancing gas, typically an oxygen source 11 and a combustible gas source 13, whether propane, chemtane, propylene, Mapp, or natural gas are set up for the cutting. The oxygen source 11 may be a single liquid oxygen source or dual liquid oxygen source connected in parallel.

If a single liquid oxygen source is chosen, special care must be used in employing it. The high flow rate of the liquid oxygen can cause hoses leading from the liquid oxygen to freeze while work is in progress. In order to prevent freezing and to ensure continuous work, dual liquid oxygen sources connected in parallel may be used in conjunction with a heater.

The cutting torch 10 is outfitted with a two part tip which can vary in size usually from a number 6 to a number 10 size tip dependent on the metal thickness. To maximize the results, the cutting tip must match the type of combustible fuel used. The cutting torch is also equipped with an easy-on air lance so that the flow of oxygen can be altered depending on the needs of the operator. The combustible fuel, whether propane or chemtane, should be delivered to the cutting torch at a pressure between about 35 and 80 pounds per square inch (PSI). This level should be constantly monitored on the fuel pressure gauge. Preferably, the combustible fuel should be set at approximately 60 PSI. The oxygen should be set to a level of about 150 to 220 PSI. Pressures below 150 PSI will still work with this method, however, when pressures are at that level, efficiency tends to decrease. Preferably, the combustible gas level is set to about 200 PSI. Often the limiting factor of the deliverable pressure is the limit of a pressurized burning hose which delivers the compressed gases from a storage tank to the cutting torch.

To ensure the safety of the operator and those around him, anyone working with or close to the cutting torch should wear safety equipment. This equipment includes a protective piece of head gear with a heat resistant lens so that the eyes and head are protected. Heat resistant clothing to protect a body from intense heat, gloves to protect hands, hearing protection for ears, and safety boots for the feet are examples of safety equipment which should preferably be worn. Those of ordinary skill in the art are familiar with the level of safety practiced and the equipment typically involved.

Figure 2A:
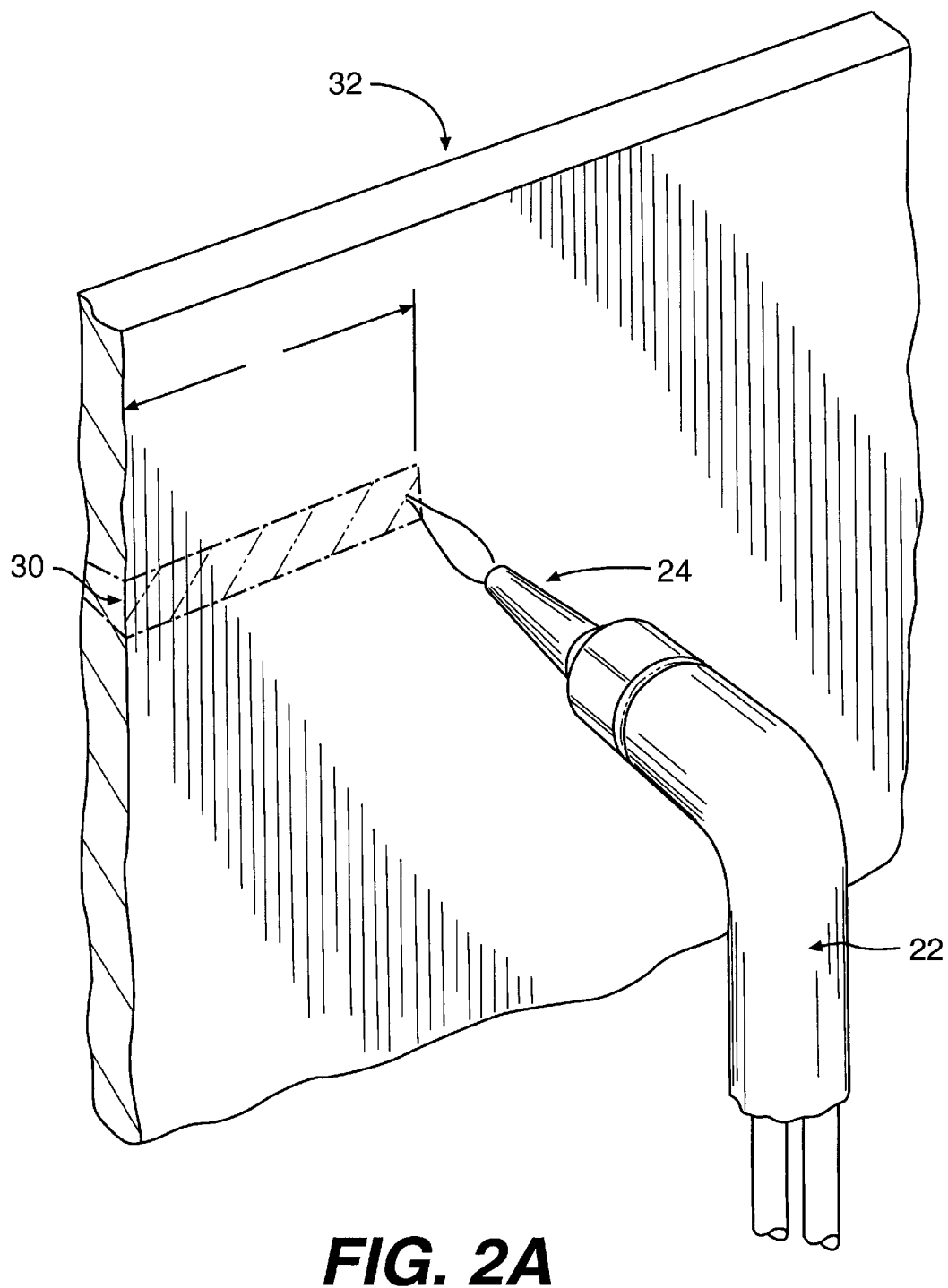
FIG. 2A is perspective view of the preferred embodiment of the invention showing the heating step.

Referring now to FIG. 2A which shows the heating of a local area, steel piece 32 is locally heated by a heat source such as cutting torch 22. Preferably cutting torch 22 is positioned about perpendicular to metal sheet 32 so as to heat local area 30 most efficiently. Local area 30 is heated until it becomes molten.

Figure 2B:
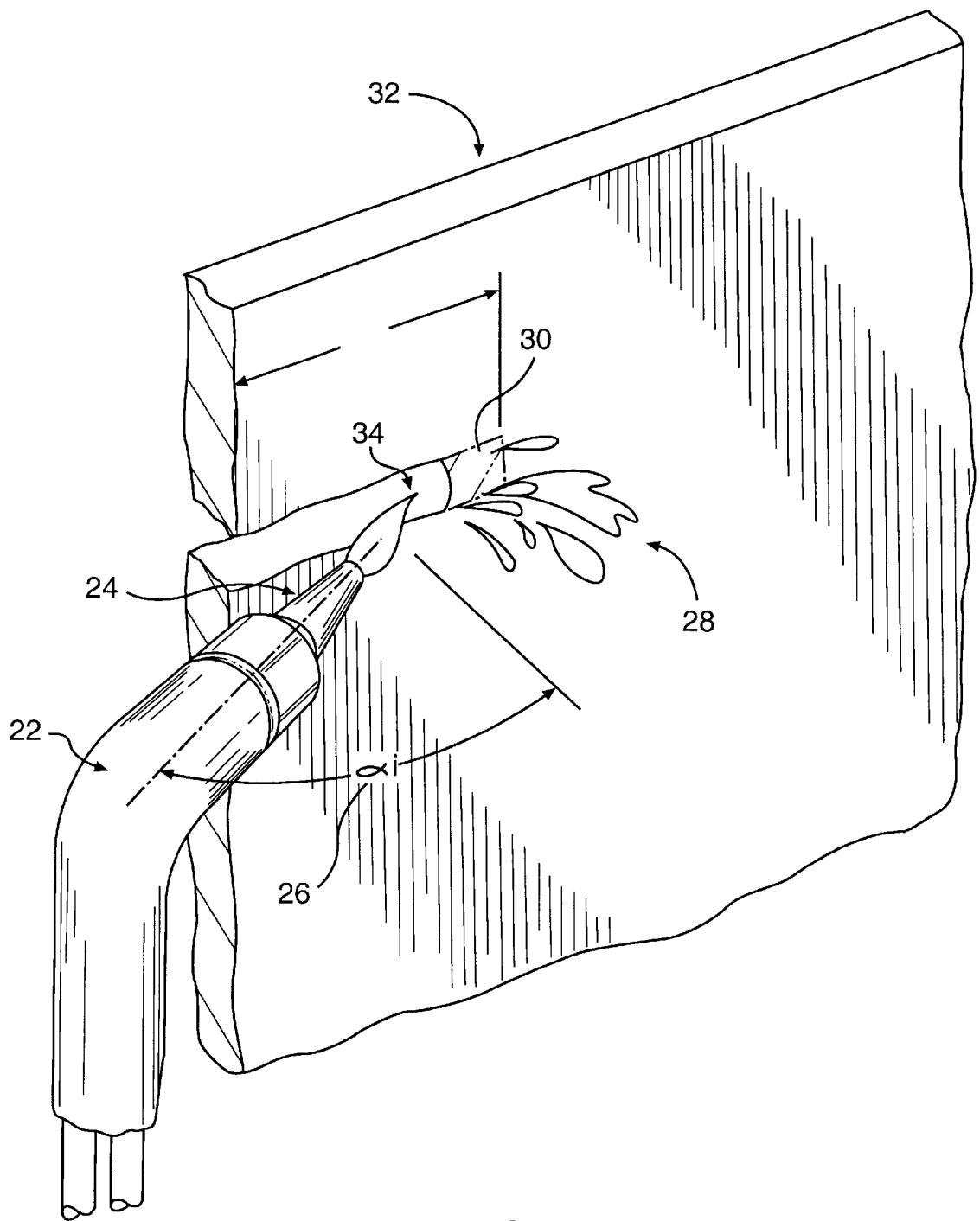
FIG. 2B is a perspective view of the preferred embodiment of the invention showing the cutting step.
Figure 2C:
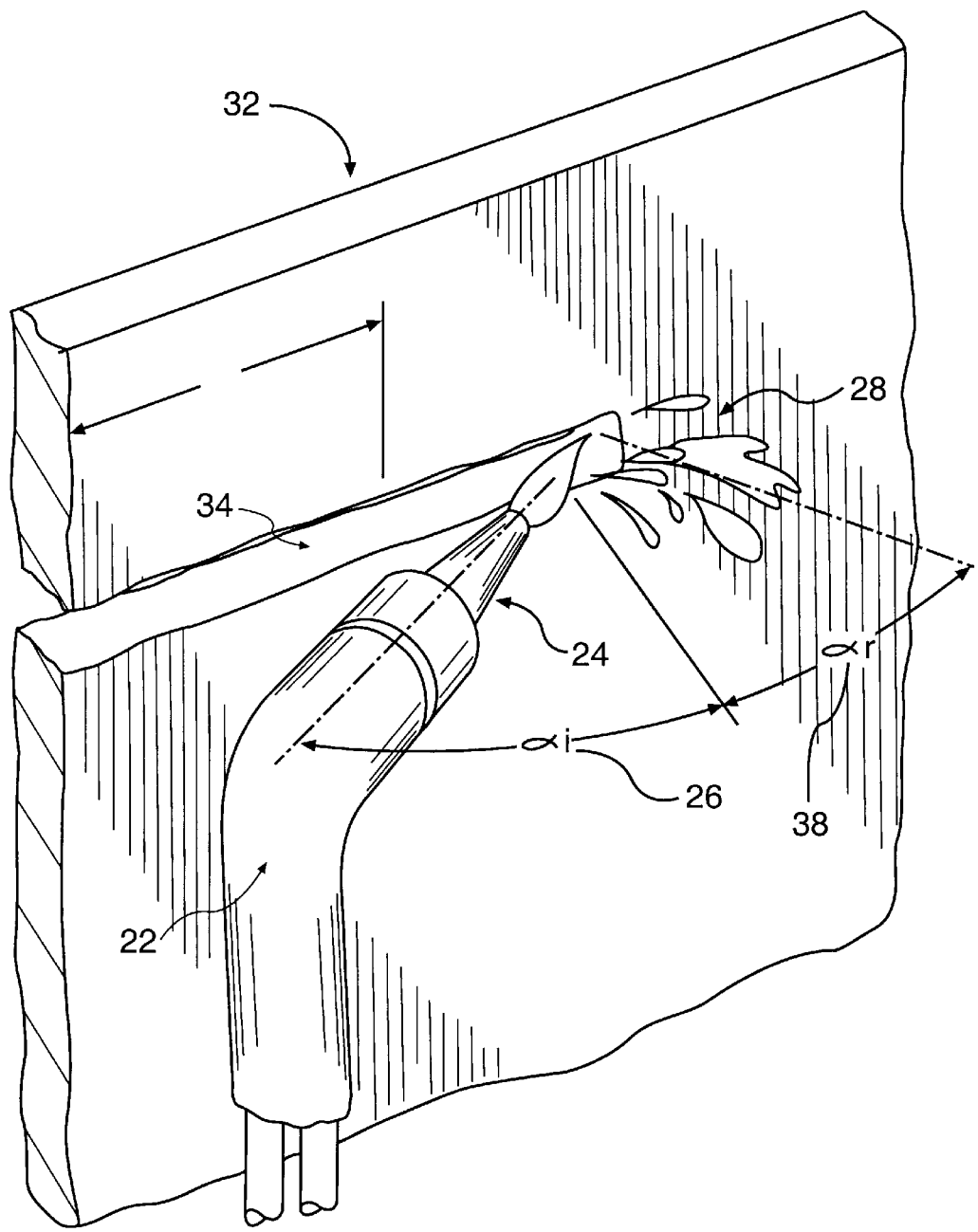
FIG. 2C is a perspective view of the preferred embodiment of the invention showing the extension of the cut.

Referring to FIG. 2B which shows the cutting step after the metal in local area 30 becomes molten, cutting torch 22 is moved from its almost perpendicular position to a position which has a large angle of incidence ($\alpha_i$) 26, preferably at least about 45 degrees. The position of cutting torch 22 at the angle of incidence ($\alpha_i$) 26 is shown in FIGS. 2B and 2C. Two part cutting tip 24 is used to force a high volume of combustion enhancing gas onto heated local area 30 to create cutting trench 34. The combustion enhancing gas, typically oxygen, heats the local area 30 additionally, thus making the molten metal 28 less viscous and easier to remove from metal sheet 32. The molten metal 28 is removed from the cut by the high volume of the combustion enhancing gas. It is expelled from the cutting trench 34 away from the cutting torch head 24 but on the same side of metal sheet 32.

Referring now to FIG. 2C which shows the extension of the cut, cutting torch 22 moves past local area 30 while maintaining an even cut 34 in metal sheet 32. Cut 34 may be continued at a constant rate depending on the thickness and type of metal sheet 32. As long as the increased heat produced by the high volume of combustion enhancing gas heats the metal to a molten state in the direction of the cut the cutting rate may be maintained. If the rate is too fast, the operator will have to slow his cutting rate and may have to reheat an area like heated local area 30 before beginning to cut the metal sheet 32 again. The molten metal 28 will move out of the cutting trench 34 in the direction of an angle of reflection ($\alpha_r$) 38 based on the angle of incidence ($\alpha_i$) 26.

Figure 3A:
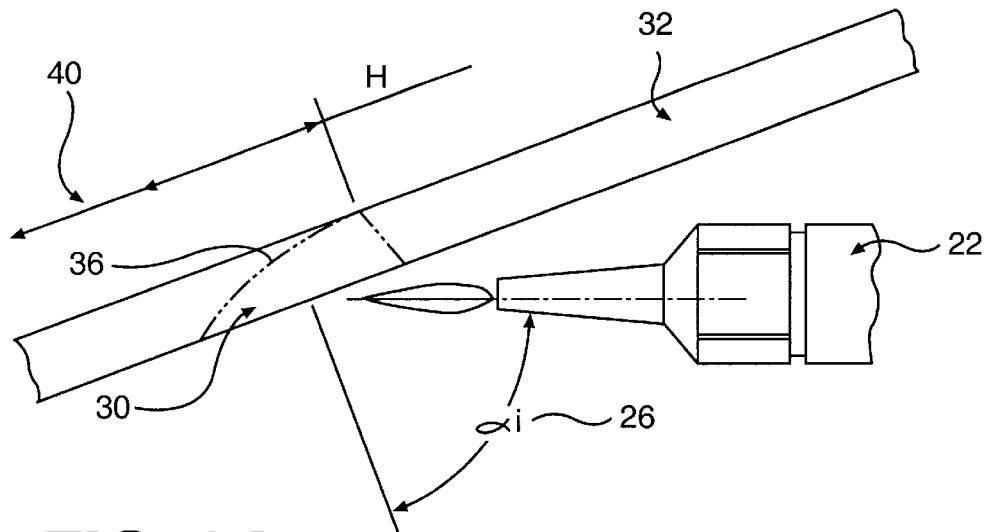
FIG. 3A is a top view of the preferred embodiment of the invention showing the beginning of the cutting step.
Figure 3B:
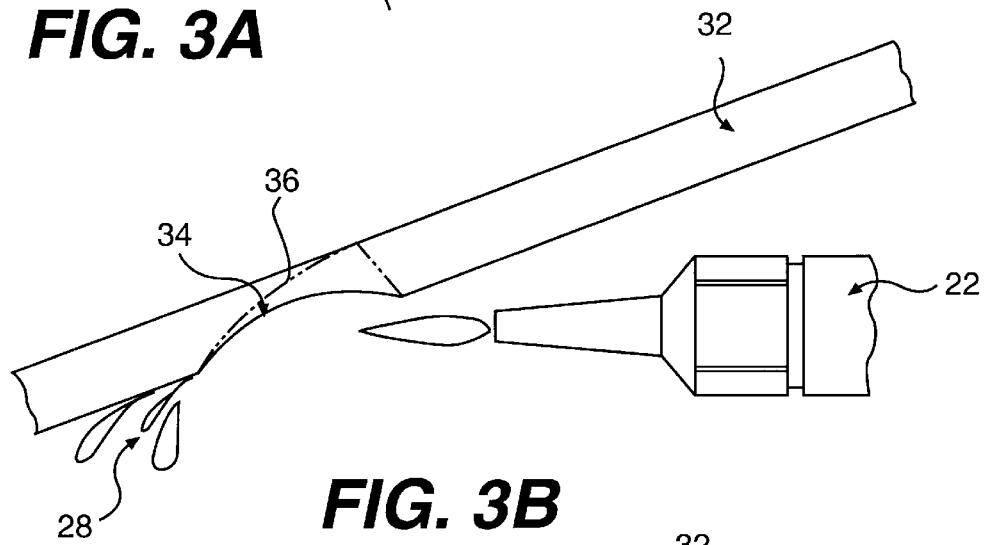
FIG. 3B is a top view of the preferred embodiment of the invention showing the cutting step where metal is removed.

In FIG. 3A, which is a top view showing the beginning of the cutting step, sheet 32 has a heated local area 30. Cutting torch 22 is positioned relative to sheet 32 at an angle of incidence ($\alpha_i$) 26. The direction of cut is in direction of arrow 40. Referring now to FIG. 3B which shows the cutting step where metal is first being removed, cutting torch 22 begins to expel high pressure combustion enhancing gases at heated local area 30. The molten metal 28 is blown out of metal sheet 32 forming cutting trench 34. If this process is continued, leading edge of cutting trench 34 will take the approximate shape of a line of excavation 36 (shown in FIGS. 3A and 3B). The molten metal 28 is removed from the trench 34 away from the cutting torch 22 at approximately the angle of reflection ($\alpha_r$) but on the same side of the sheet 32 as the cutting torch 22.

Figure 3C:
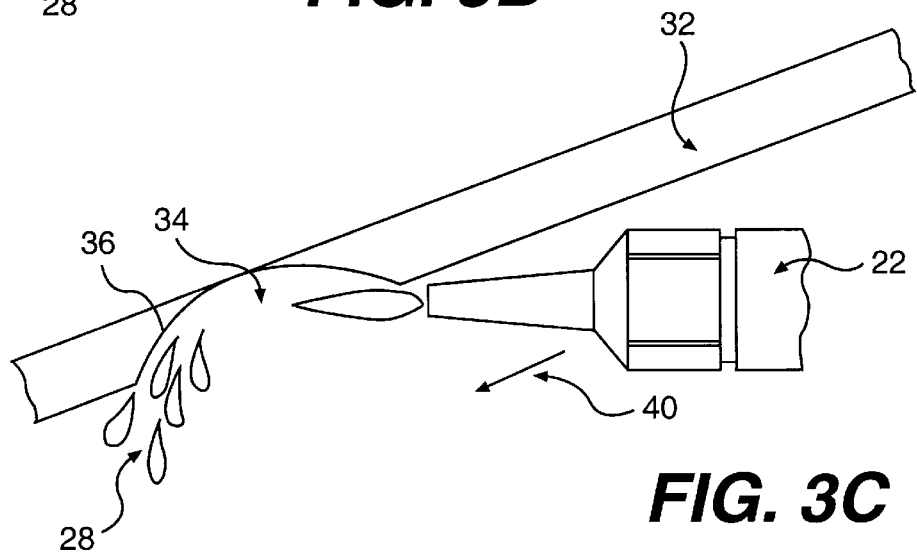
FIG. 3C is a top view of the preferred embodiment of the invention showing a further stage of the cutting step before the cutting torch moves generally parallel to the cut line.

Referring to FIG. 3C, which shows a further stage of the cutting step, cutting torch 22 is moved generally parallel to sheet 32 as shown by arrow 40, heating the metal sheet in the direction of cut and pushing the molten metal 28 out of cutting trench 34 along the line of excavation 36. Such cut may be continued at a rate to ensure that the metal along line of excavation 36 is heated to molten temperatures.

In order to cut at a constant rate, several factors must be controlled. One having ordinary skill in the art will have experience controlling the factors, but must accommodate the new position of the cutting torch, the high pressures of the gases, and the different heat created by burning propane or chemtane with high pressure oxygen. By rotating the cutting torch head about a fixed point the angle of incidence is changed. The smaller the angle of incidence ($\alpha_i$), the more heat is transferred to a smaller area of metal. To a point, the more oxygen which is added to the combustion process results in more heat being created. A person having ordinary skill in the art should know that the oxygen should not be applied at high pressures when the angle of incidence ($\alpha_i$) is low, unless one desires to be covered with molten metal. Heat to an area may also be regulated by moving the tip closer to the metal. An experienced person will be able to control the angle of incidence, the flow of oxygen, and the distance from the tip to the metal without harming others while maintaining an efficient cutting rate.

It should be further understood by those of ordinary skill in the art that the foregoing presently preferred embodiments are exemplary only and that the attendant description thereof is likewise by way of words of example rather than words of limitation, and their use does not preclude inclusion of such modifications, variations and/or additions to the present invention as would be readily apparent to one of ordinary skill in the art, the scope of the present invention being set forth in the appended claims.

What is claimed is:

1. A method for cutting metal, comprising:

heating metal locally to a molten state by holding a cutting torch generally perpendicular to the surface where the cutting torch has a two-part tip which releases both a combustible gas and a combustion enhancing gas and generally in the same direction and has a control means for gradually changing gas pressures;

directing the gases at the molten metal at an angle of incidence ($\alpha_i$) with a horizontal plane of the molten metal of at least about 45 degrees and increasing the flow rate of the combustion enhancing gas thereby removing the molten metal from the local area creating a cutting trench;

maintaining an angle of incidence ($\alpha_i$) of at least about 45 degrees to remove the molten metal from the cutting trench so that the molten metal exits the cutting trench in the same direction as the angle of reflection ($\alpha_r$) away from the operator, but on the same side of the plane of the metal on which the cutting torch is located;

moving the cutting torch in a direction generally parallel to a desired cut line to expand the cut line; and varying at least one of the distance from the cutting tip to the metal and the flow rate of the oxygen so as to provide heat making a cut.

2. A method for cutting metal according to claim 1, wherein the combustible gas is propane and it is adjusted between about 35 to 80 psi.

3. A method for cutting metal according to claim 1, wherein the combustible gas is chemtane and it is adjusted between about 35 to 80 psi.

4. A method for cutting metal according to claim 1, wherein the combustion enhancing gas is oxygen and it is adjusted between about 150 and 220 psi.

5. A method for cutting metal according to claim 1, wherein the combustion enhancing gas is a dual liquid oxygen source.

6. A method for cutting metal from ships, comprising:

heating metal locally to a molten state by holding a cutting torch generally perpendicular to the surface, where the cutting torch with control means has a two-part tip which releases both a combustible gas and a combustion enhancing gas in the same general direction, with the combustible gas adjusted between about 35 to 80 psi and oxygen adjusted between about 150 and 220 psi;

directing the gases at the molten metal at an angle of incidence ($\alpha_i$) with a plane of the molten steel of at least about 45 degrees and increasing the flow rate of the combustion enhancing gas, thereby removing the molten metal from the local area creating a cutting trench;

maintaining an angle of incidence ($\alpha_i$) of at least 45 degrees to remove the molten metal from the cutting trench so that the molten metal exits the cutting trench in the same direction as the angle of reflection away ($\alpha_r$) from the operator, but on the same side of the plane of the metal on which the cutting torch is located;

moving the cutting torch in a direction generally parallel to a desired cut line to expand the cut line; and varying the distance from the cutting tip to the metal and the flow rate of the oxygen so as to provide heat making a cut.

7. A method for cutting metal according to claim 6, wherein the two-part tip is size No. 6 through No. 10 cutting tip.

* * * * *